Dec. 12, 1944.   R. T. POLLOCK ET AL   2,364,653
ESCAPEMENT MECHANISM
Filed Feb. 7, 1942          7 Sheets-Sheet 4

INVENTORS
ROBERT THOMAS POLLOCK
OTTO C.W. HENZE.
BY
Frederick P. Warfield
ATTORNEY

INVENTORS
ROBERT THOMAS POLLOCK
OTTO C. W. HENZE
BY
ATTORNEY

INVENTORS
ROBERT THOMAS POLLOCK
OTTO C. W. HENZE
BY
ATTORNEY

Dec. 12, 1944.   R. T. POLLOCK ET AL   2,364,653
ESCAPEMENT MECHANISM
Filed Feb. 7, 1942   7 Sheets-Sheet 7

INVENTORS
ROBERT THOMAS POLLOCK
OTTO C. W. HENZE
ATTORNEY

Patented Dec. 12, 1944

2,364,653

UNITED STATES PATENT OFFICE 2,364,653

ESCAPEMENT MECHANISM

Robert Thomas Pollock and Otto C. W. Henze, New York, N. Y., assignors to Joseph Lee Sweeney, New York, N. Y.

Application February 7, 1942, Serial No. 429,886

20 Claims. (Cl. 197—84)

This invention relates to an escapement mechanism which may have general application, and also to a typewriter using the escapement mechanism whereby certain beneficial results are attained which will be hereinafter described.

One of the objects of the invention is to provide an escapement mechanism in which the amount of movement is adjustable.

Another object of the invention is to provide an escapement mechanism with an adjustable movement, the adjustment being infinite within certain predetermined limits.

Another object of the invention is to provide an escapement mechanism in which the movement is adjustable and may be adjusted even when the mechanism is operating.

Still another object of the invention is to provide an escapement mechanism in which the amount of movement is controlled by a differential connection.

Still another object of the invention is to provide a typewriting machine in which the spaces between the printed characters may be adjusted to any distance within predetermined limits.

Another object of the invention is to provide a typewriting machine with an adjustable spacer in which the distance the carriage moves after the character is printed is predetermined during the movement of the type bar towards the platen.

Still another object of the invention is to provide a typewriting machine with an escapement mechanism in which the operation of the key of the typewriter first sets the escapement mechanism for a predetermined movement of the carriage, and subsequently releases the escapement so that the carriage can travel the predetermined distance.

Another object of the invention is to provide a typewriting machine, as described in the paragraph above, in which the setting of the escapement mechanism by the operation of a key is predetermined by an adjustable mechanism.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawings, in which:

Fig. 9 is a sample of the typing which can be done on the typewriting machine disclosed in the various figures.

In general the escapement mechanism comprises a differential gear unit somewhat similar to the differential gear of an automobile with the intermittently movable element operatively connected to one side shaft. The planetary gear of the differential unit is mounted in a disk which is provided with a clutch so that the disk may be held or may be permitted to rotate, and the operation of the clutch is substantially instantaneous. One gear of the differential is connected with a lever which has a limited swinging movement between stops, the amount of this movement being adjustable.

The manner in which this mechanism is operated to produce the escapement effect is best described in connection with some device in which the escapement may be used, such as a typewriting machine, and, therefore, a typewriting machine has been shown throughout the drawings with the escapement mechanism applied thereto. It is to be understood, however, that the mechanism may have general application wherever it is desired to provide an adjustable escapement. Since the invention concerns the escapement mechanism and its application to a typewriter, only those parts of the typewriter which are associated with the escapement mechanism need be shown, the other parts being standard and known to those skilled in the art.

Figure 1:
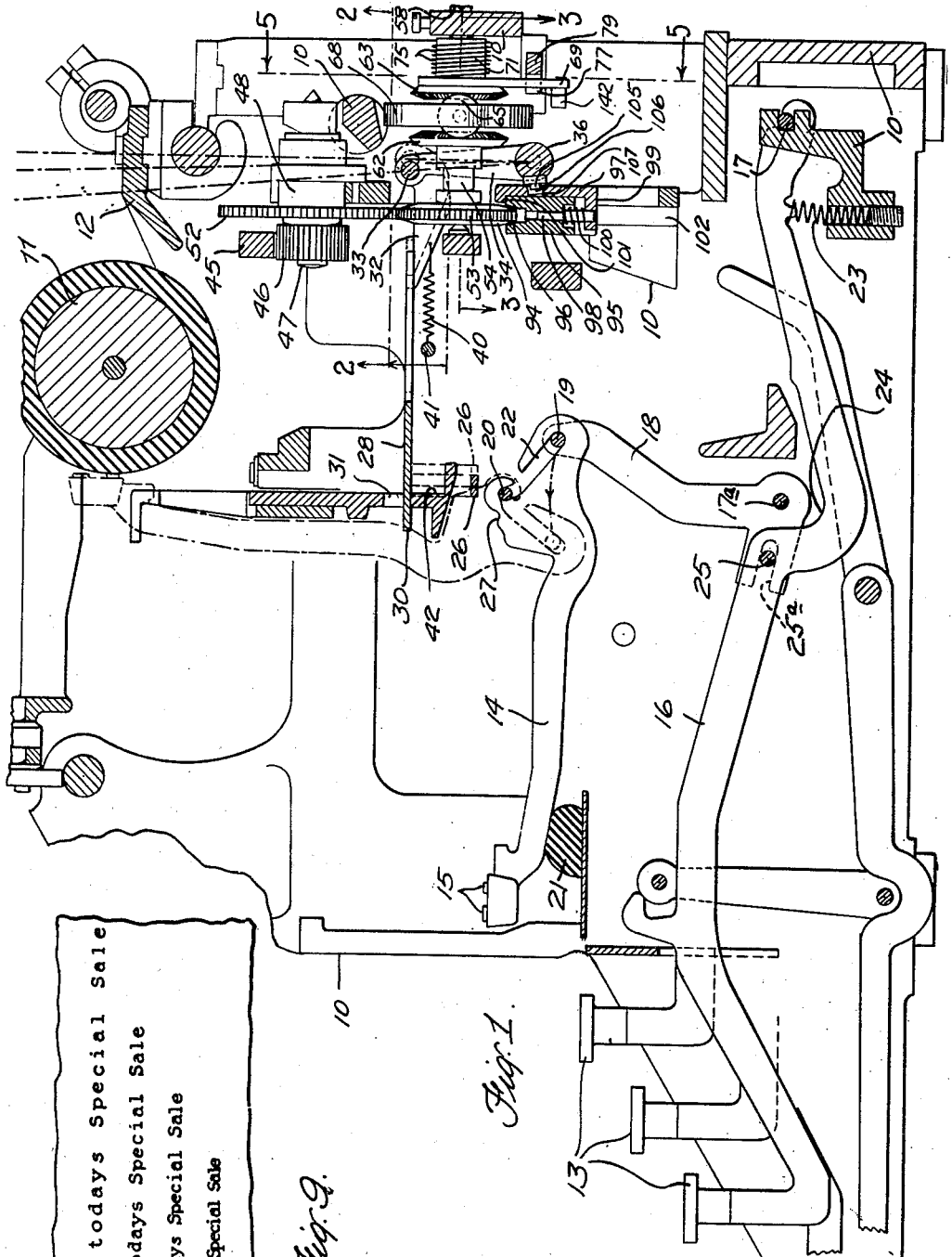
Fig. 1 is a sectional side elevational view of a typewriter taken at substantially the center of the machine where the types strike against the platen and showing our new escapement mechanism applied thereto.

Referring now to Fig. 1, a typewriting machine is shown having a frame consisting of numerous parts all of which are stationary. Wherever such parts are shown they have been designated by the reference character 10. A platen 11 is shown mounted on a carriage 12 which is slidably mounted for longitudinal movement in the frame 10 in any conventional manner. A plurality of keys 13 are operatively connected to type bars 14 which carry types 15, the levers being so arranged that the types will strike against the platen 11 when the keys are depressed. In the drawings, the ribbon and paper have been omitted but it will be understood that the paper is wrapped around the platen and the inking ribbon is in front of the paper and is struck by the types when the machine is operated to print the characters on the paper.

As shown in Fig. 1, the keys 13 are mounted on key levers 16 which are pivoted at 17 to a portion of the frame 10. Upwardly extending arms 18 are pivoted at 17a and have pins 19 at the upper ends thereof. The type bars 14 are pivoted at 20 and normally lie in a horizontal position with the type and resting against a suitable cushion 21. Each type bar extends beyond its pivot 20 and is provided with a slot 22 which extends at an angle to the bar and engages the pin 19 on the end of the associated arm 18, the pin 19 resting normally against the lowermost end of the slot. The arrangement is such that when a key 13 is depressed, the key lever 16 rotates around the pivot 17, thus swinging the arm 18 towards the front of the machine, whereupon the pin 19 causes the type bar 14 to swing up about its pivot 20, the pin 19 sliding in the slot 22 as the type bar moves.

The escapement mechanism is operated by a bail 26 which is moved by a cam surface 27 formed on the type bar 14 adjacent the pivot 20. The arrangement is such that the type bar moves about ⅘ of its travel before the cam 27 strikes the bail 26, as will be explained later in connection with Figs. 6 and 7. The bail 26 in the particular typewriter selected for disclosing the invention is a curved bar curved to conform with the configuration of the type bars which are mounted in a fan-shaped arrangement. The bail 26 is secured to a plate 28 which lies horizontally in the machine and is mounted for backward and forward movement. The plate 28 is suitably cut out to reduce the weight, and its forward end is provided with an extension 30 which slides in a suitable slot 31 in the frame 10. The rear end of the plate 28 is provided at the sides thereof with two arms 32 which are pivotally connected to a rod 33 which is mounted on the upper ends of the arms 34 of a vertically positioned yoke member 36. The main portion of the yoke 36 is pivotally connected in the frame 10 by suitable pivots 38 which are on an axis perpendicular to the direction of movement of the plate 28. The yoke 36 supports the rear end of the plate 28 and permits the plate to move backwards and forwards in the machine as the yoke rotates about its pivots 38.

The movement of the yoke 36 is caused to operate the escapement mechanism in a manner to be hereinafter described; it also operates the ribbon feeding device by means of a lever 39 (Fig. 5) which depends from the center thereof but the operation of which need not be described in this application. A spring 40 (Fig. 1) connected between a portion of the plate 28 and a pin 41 on the frame 10 urges the plate 28 in a forward direction at all times, and the plate is prevented from moving too far forward by the bail 26 which engages a suitable stop 42 on the frame 10.

The carriage 12 is provided with a rack 45 which extends from side to side of the machine and moves as the carriage moves, and this rack meshes with a pinion 46 mounted on a shaft 47 which has a suitable bearing 48 on a portion of the frame 10. The bearing 48 is mounted on a bifurcated bracket 48a (Figs. 3 and 5) which straddles the shaft of the differential mechanism and is secured to the frame 10 by screws 49. The pinion 46, following the usual practice, is used to control the movement of the carriage which is urged in one direction by a ribbon or tape 50 attached to some portion of the carriage as by a pin 51 (shown attached to the rack in Fig. 5) and which winds up upon a drum (not shown) under the action of a suitable spiral spring. When the carriage is moved towards the right side of the machine, the tape is unwound from the drum and the spring wound up, and the tension of the spring causes the tape to urge the carriage continuously towards the left of the machine.

A gear 52 is mounted on the shaft 47 so that it turns with the pinion 46, and this gear meshes with another gear 53 mounted immediately below it on a shaft 54 (Fig. 3) which is rotatably mounted in the frame 10 of the machine and is parallel to the shaft 47. The forward end of the shaft 54 is provided with a conical depression which rotates on a pivot point 56 secured in the frame 10, while the rear end of the shaft has a conical point 57 which rotates in a suitable bearing screw 58 threaded into a tapped hole 59 in another portion of the frame 10. The screw 58 may be adjusted to take up any slack in the bearings for the shaft 54.

The shaft 54 is the shaft upon which the differential mechanism is mounted and the gear 53 is rigidly attached to the shaft. A bevel gear 62, forming part of the differential mechanism, is mounted on the shaft 54 and is rigidly attached thereto, while a second bevel gear 63 is also mounted on the shaft but is free to rotate thereon. The bevel gears 62 and 63 have teeth which face each other and between them is mounted the planetary pinion gears 64 and 65 which mesh with the teeth of the gears 62 and 63. The planetary gears 64 and 65 are rotatably mounted in a disk 68 which in turn is rotatably mounted upon the shaft 54, the disk 68 being free to rotate on the shaft. The disk 68 may be made in two or more parts to facilitate mounting the planetary gears, and, for a purpose to be later described, the sides of the disk adjacent the periphery are made true and smooth and are hardened.

If the disk 68 is held against rotation, it will be seen that in order to rotate the gear 53 which is attached to the bevel gear 62, the bevel gear 63 must rotate, and if the gear 53 is held, the only way the bevel gear 63 can be rotated is by releasing the disk 68 and permitting it to turn, so that the planetary pinion gears 64 and 65 roll around the bevel gear 62. The same thing is true if the gear 63 is held; the disk 68 must be released in order to permit the gears 62 and 53 to move. This differential unit, then, consists of three elements, the disk and the two bevel gears, which are operatively connected together so that if any one is held against movement, movement of one of the other two will cause the third one to move. We provide separate means to hold the gear 53 and the disk 68, and these holding means will be described hereinafter.

Figure 3:
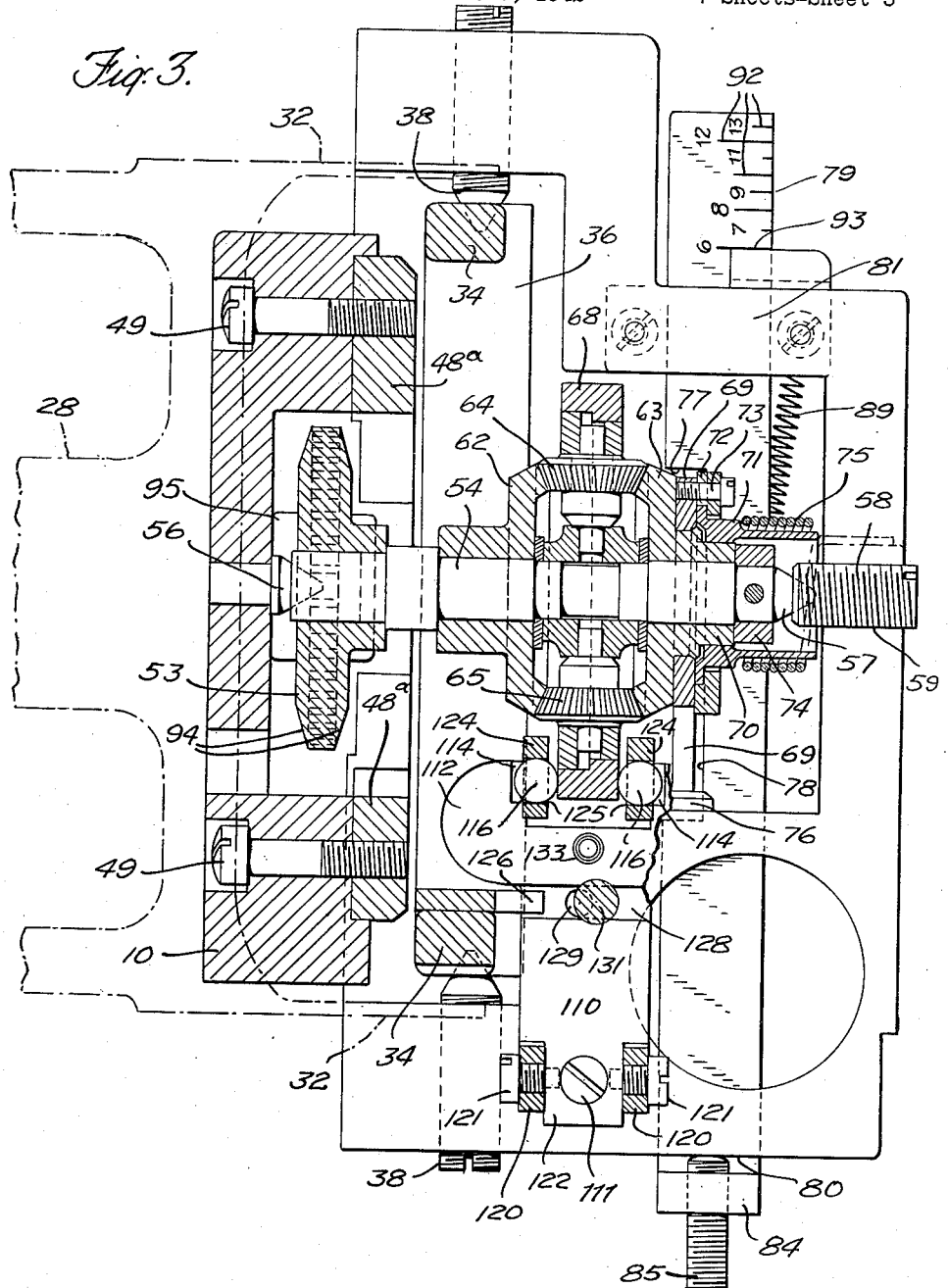
Fig. 3 is a similar sectional plan view through the escapement mechanism taken on the line 3—3 of Fig. 1.
Figure 4:
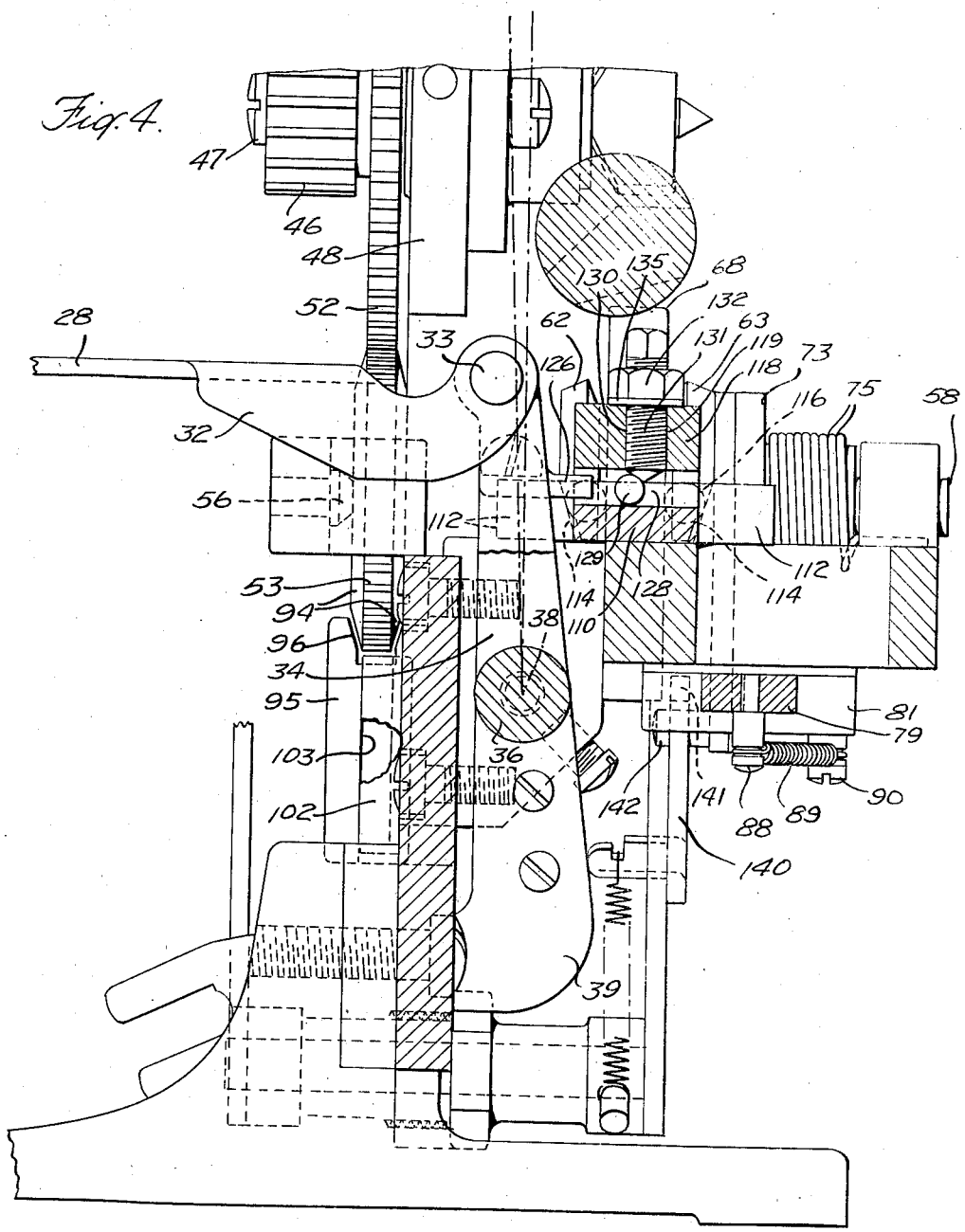
Fig. 4 is an enlarged sectional side elevational view taken on the lines 4—4 of Fig. 2.
Figure 5:
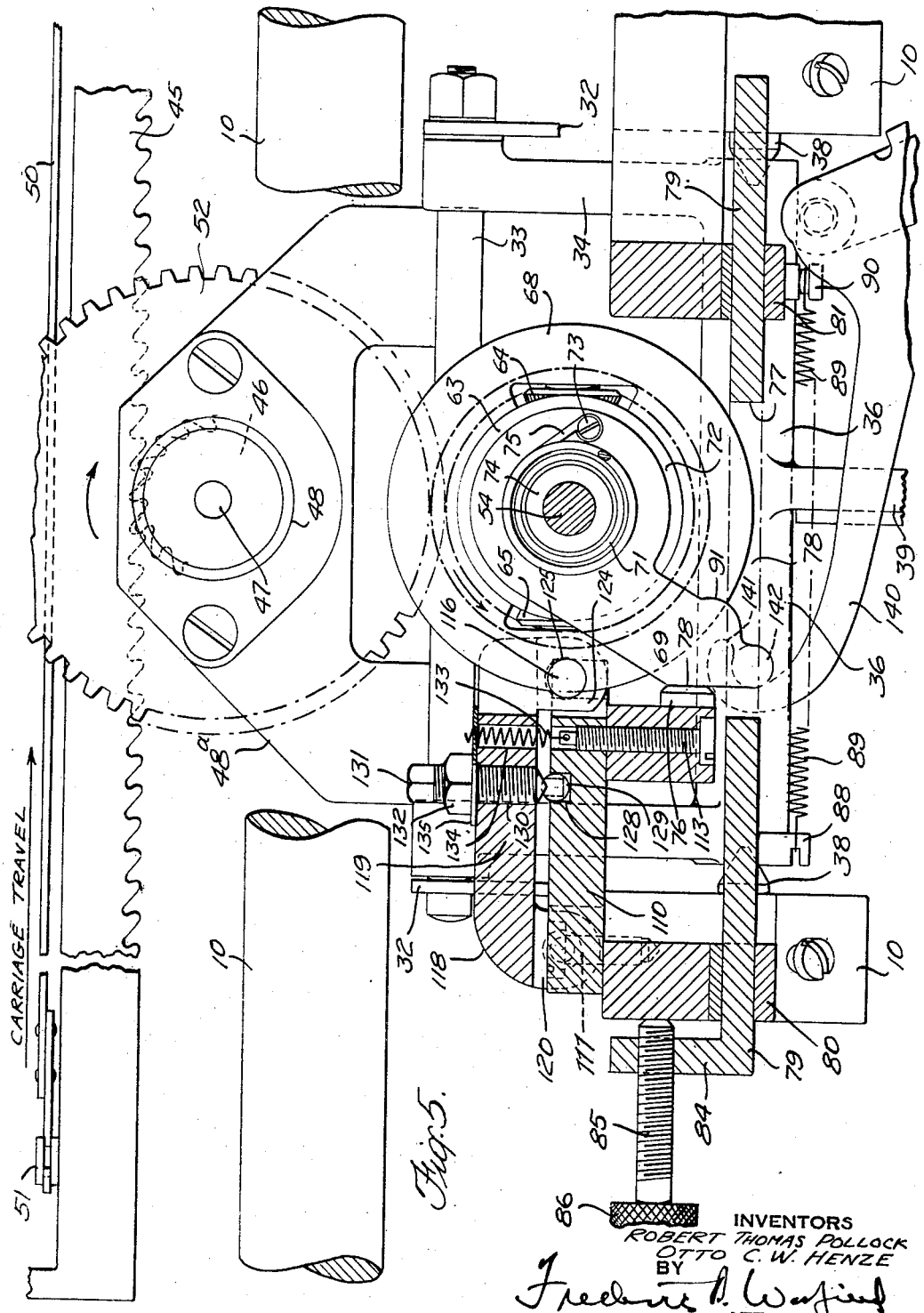
Fig. 5 is an enlarged rear view of a portion of the typewriter of Fig. 1, partly in section, the section being taken on the lines 5—5 of Figs. 1 and 2.

Aside from any restraint placed upon it by the associated parts of the differential mechanism, the bevel gear 63 is permitted to rotate through a certain predetermined limited angle of rotation, and this amount of rotation will determine the distance of movement of the escapement mechanism and therefore the distance of movement of the typewriter carriage, as will be hereinafter explained. In order to provide this limited movement of the bevel gear 63 and also to provide a means to adjust the amount of such movement, the bevel gear is provided with depending lever arm 69 (Fig. 5). This arm has an enlarged opening which fits over the hub 70 of the gear 63 and is held securely on the hub by a portion of the hub being swaged against it (Fig. 3). A sleeve 71 is also fitted over the hub 70 and is held in place by a ring 72 secured to the arm 69 by suitable screws 73. A collar 74 holds the gear 63 on the shaft 54 and the outer end of the sleeve 71 extends over the collar 74 and the end of the bearing screw 58. The gear 63 is urged to rotate in a counter-clockwise direction, as viewed from the rear of the machine, as in Fig. 5, by means of a coil spring 75 which is wound around the sleeve 71 and has one end attached to the gear 63 and the other to the frame. When the gear is rotated in a clockwise direction it winds the spring. The urge of the spring 75 on the gear 63 must, however, be weaker than the force that the pull of the carriage exerts on the same gear.

The arm 69 extends downwardly from the gear 63 and operates between two stops 76 and 77 (Fig. 5). The stop 76 is fixed to a portion of the frame 10 and is preferably made of hardened metal so that it will withstand the shock of the arm striking against it, and the arm is provided with a flat surface 78 to strike against the stop.

The other stop 77 is a shoulder formed at one end of a slot 78 on an adjustment bar 79 which is slidably mounted in suitable bearings 80 and 81 attached to the frame 10. The left end of the bar 79, as viewed in Fig. 5, is provided with a flange 84 which carries an adjusting screw 85 threaded into it and provided with a knurled head 86 for manual adjustment. The inner end of the screw 85 is adapted to bear against a portion of the bearing 80 which is part of the frame 10. The bar 79 is provided with a depending pin 88 to which is attached a spring 89, the other end of the spring being attached to a pin 90 fastened to the right of the frame, as viewed in Fig. 5. The spring 89 tends to urge the bar 79 towards the right, as viewed in Fig. 5, so that the position of the stop 77 can be adjusted by rotating the screw 85. The lower end of the arm 69 where it contacts with the stop 77 is preferably curved, as at 91, so that the arm will always present the same character of surface to the flat portion of the stop 77, regardless of the position of the stop.

When the stop 77 is moved towards the right as far as it will go by unscrewing the screw 85, the arm 69 will have its maximum rotary or swinging movement, while when the bar 79 is moved towards the left by screwing in the screw 85 the stop 77 is at its furthermost left position and the arm 69 will have its minimum movement.

Figure 2:
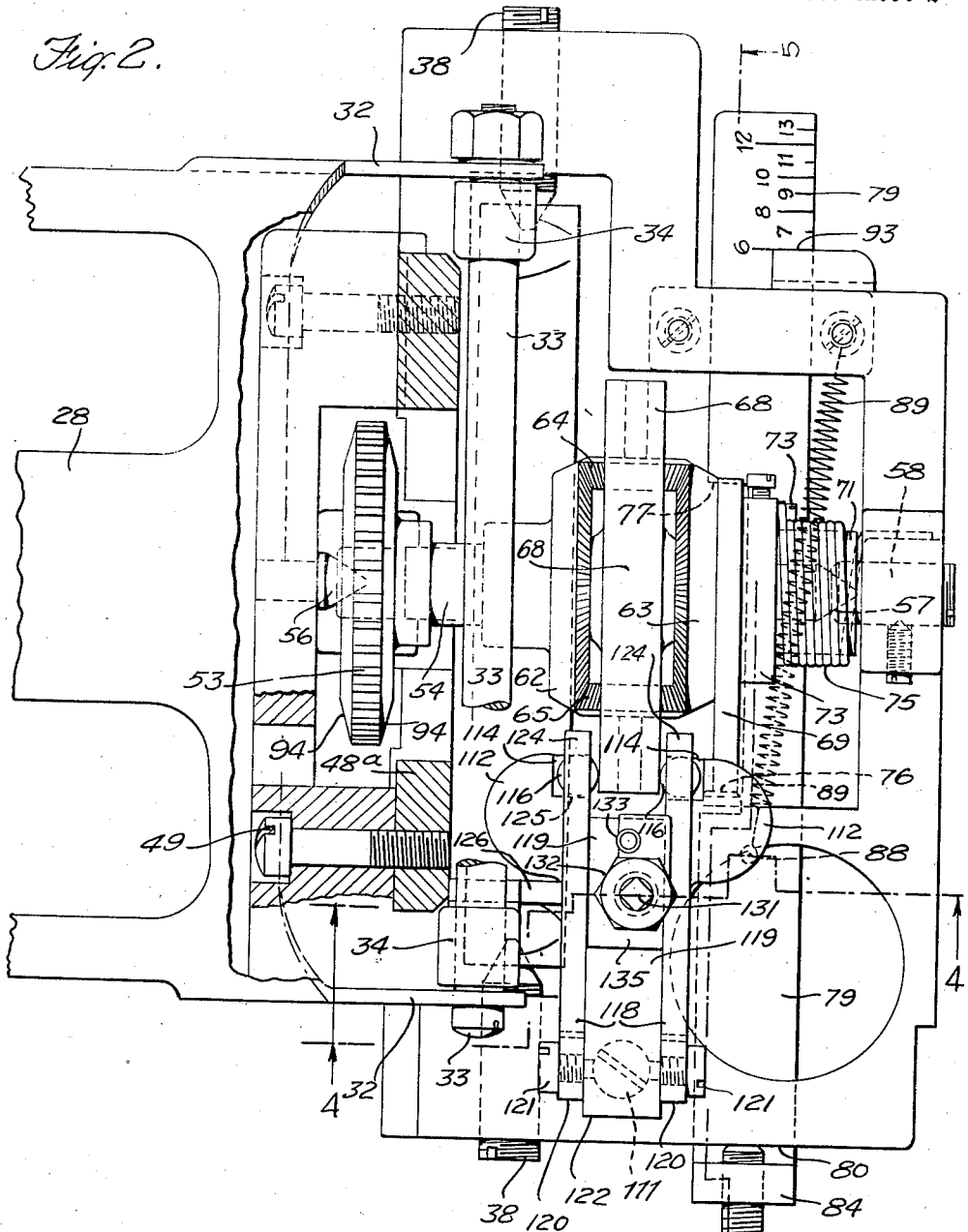
Fig. 2 is an enlarged sectional plan view of the escapement mechanism and associated parts taken on the lines 2—2 of Fig. 1.

The bar 79 is preferably provided with a scale 92 on the upper surface thereof, (Figs. 2 and 3) and a member 93 forming part of the bearing 81 has a sharp edge against which the scale may be read. Thus the positions of the bar 79 may be determined by reading the number on the scale 92 which lies against the edge 93. The lines on the scale may be as fine and as close together as desired to obtain an accurate adjustment of the bar.

The gear 53 is provided with a holding means or clutch which is illustrated in Figs. 1, 4, 6, and 7. To this end the gear is tapered adjacent the periphery so that the extreme edge of the gear is thinner than the central portion thereof. This forms surfaces 94 against which the holding means acts by friction. The holding means comprises a block 95 which is positioned immediately beneath the gear 53 and is provided at its upper end with a V-shaped notch 96 adapted to conform to and engage the surfaces 94 when the block is pushed against the edge of the gear. The block 95 is mounted in a holder 97 which is arranged for vertical movement in the frame 10. The block 95 is slidably mounted in the holder 97 by means of a rod 98 which extends upwardly from a flange 99 at the bottom of the holder and which fits into a hole in the block. The block is urged upwardly in the holder by means of a spring 100 which seats against the bottom flange 99 on the holder 97 and presses against the bottom of the block 95. A shoulder 101 at the top of the holder 97 prevents the block 95 from being forced too far upwardly by the spring 100. The block 95 is guided in its vertical movement in the machine by vertical ribs 102 which are attached to the frame and which fit into grooves 103 in the sides of the block 95.

The arrangement is such that when the holder 97 is moved upwardly the V-groove 96 in the block 95 contacts with the surfaces 94 on the gear wheel. However, the holder 97 can be raised still farther as the spring 100 compresses, the spring acting to press the block 95 harder against the gear wheel. Thus the holder is permitted additional movement after the block 95 contacts with the gear, during which time certain other parts are operated, as will be later explained.

The holder 97 is moved in the frame of the machine by means of a ball and socket connection with the yoke 36. This connection comprises a pin 105 which carries at the end thereof a head 106 having a spherical curvature. This head extends into a circular opening 107 in the holder 97. When the yoke 36 is rotated about the pivots 38 in a clockwise direction, as viewed in Fig. 1, the holder 97 will move upwardly to cause the block 95 to engage the gear wheel 53; when the yoke 36 is rotated in the other direction, the holder 97 will move downwardly thus moving the block 95 out of contact with the gear wheel 53. Since the yoke 36 is moved by the plate 28 and the latter is moved by any of the type bars, the operation of one of the type bars will cause the operation of the holding means for the gear 53. However, as will be explained later, the holding means does not move into contact with the gear 53 until the type bar has moved through a large portion of its stroke.

Means is provided to hold the disk 68 and to grasp and release the disk substantially instantaneously. To this end a block 110 is rigidly attached to the frame at the left side of the disk, as viewed in Fig. 5, as by means of a screw 111 and a screw 113. This block is provided at its inner end adjacent the disk 68 with a pair of heavy thick arms 112 (Figs. 3 and 5) which extend outwardly from the sides of the block 110 and straddle the edge of the disk 68. The inner sides of these arms which face the disk 68 are provided with tapered surfaces 114 (Fig. 4) the lowermost edges of these surfaces being nearest to the disk. A pair of steel balls 116 are positioned between the side surfaces of the disk 68 and the tapered surfaces 114 of the arms 112. The spacing of the surfaces 114 from the disk and the size of the balls is so arranged that if the balls move downwardly, which they normally do under the influence of gravity, they are wedged between the surfaces 114 and the side surfaces of the disk, thus grasping the disk securely and preventing it from moving in a counter-clockwise direction, as viewed in Fig. 5. The tapered surfaces 114 may be at an angle of approximately 11 degrees with the plane of the disk for good results. With this arrangement the disk 68 may be rotated in the opposite direction, because the balls will then ride upwardly on the tapered surfaces and free themselves from the jamming action.

Means is provided to raise the balls 116 when desired so that they release their grip on the disk 68. This means comprises a pair of spaced plates 118 (Figs. 2, 4, and 5) which are held in alignment with the balls by means of a block 119 to which the plates are rigidly secured. The outer ends 120 of these plates are curved downwardly, as best shown in Fig. 5, and are provided with holes adapted to receive pivot screws 121 (Figs. 2 and 3) which pivot the plates 118 to the block 110 at the outer end 122 thereof, this end being reduced in thickness at this point by an amount corresponding to the thickness of the plates 118. Thus mounted, the plates 118 are free to rotate about the pivot screws 121.

The inner ends 124 of the plates 118 extend downwardly at right angles to the main portions of the plates and are provided with holes 125 large enough to receive the balls 116 to permit the balls to rotate therein but with close enough fit to prevent any loose motion. These plates thus act to retain the balls in position between the disk 68 and the surfaces 114 and also to move the balls upwardly out of clamping engagement with the disk when the plates 118 and central block 119 are raised.

In order to raise the plates 118 and central block 119, mechanism is provided which is operated by the bail 26. To this end the yoke 36 adjacent the left arm 34, as viewed from the rear of the machine, is provided with a lug 126 which extends rearwardly and is moved in a rearwardly direction when the bail 26 is moved rearwardly. The block 110 is provided with a transverse channel 128 which is aligned with the lug 126 and into which the lug extends. A ball 129 is spaced in the channel 128 so that it may be struck by the lug 126 when the lug moves farther into the channel. The block 119 is provided with a tapped hole 130 which is aligned with the channel 128 beneath it and into which is threaded a screw 131 provided with a suitable locking nut 132. The end of the screw 131 is conically bevelled at an angle of approximately 30 degrees, and when the screw is screwed far enough down it will retain the ball 129 between the end thereof and the lug 126, but when the lug 126 is forced into the channel 128 by the action of the bail 26, the lug will strike the ball 129 which in turn will strike the angular surface of the lower end of the screw 131 and force the screw and associated block 119 and side plates 118 upwardly, thus raising the balls 116 from their gripping position against the disk 68.

A tension spring 133 (Fig. 5) is attached between the block 110 and the block 119. The spring is attached to the inner end of the screw 113 and extends up through a suitable hole 134 provided for it in the block 119 and is secured by a plate 135 which rests on top of the block 119 and is held by the nut 132, the convolutions of the spring being engaged by the edges of a hole in the plate which is smaller in diameter than the diameter of the spring. The spring urges this block 119 and plates 118 to their lowermost position, with the balls 116 engaging the disk 68, when the lug 126 is withdrawn from engagement with the ball 129.

By adjusting the screw 131 the timing of the release and engagement of the balls 116 may be predetermined as desired. This timing is important in the operation of the invention.

Figure 6:
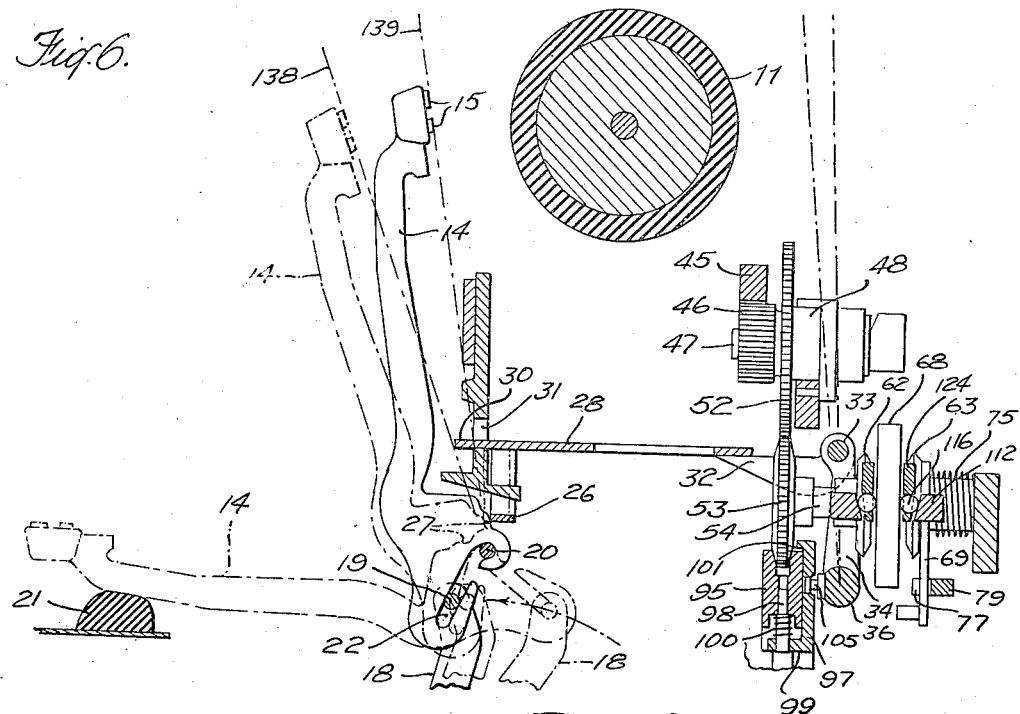
Figs. 6 and 7 are sectional side elevational views showing the escapement mechanism with different positions of one of the type bars, these figures being on approximately the same scale as Fig. 1 and the sections being taken through the center of the machine at the point where the types strike against the platen.
Figure 7:
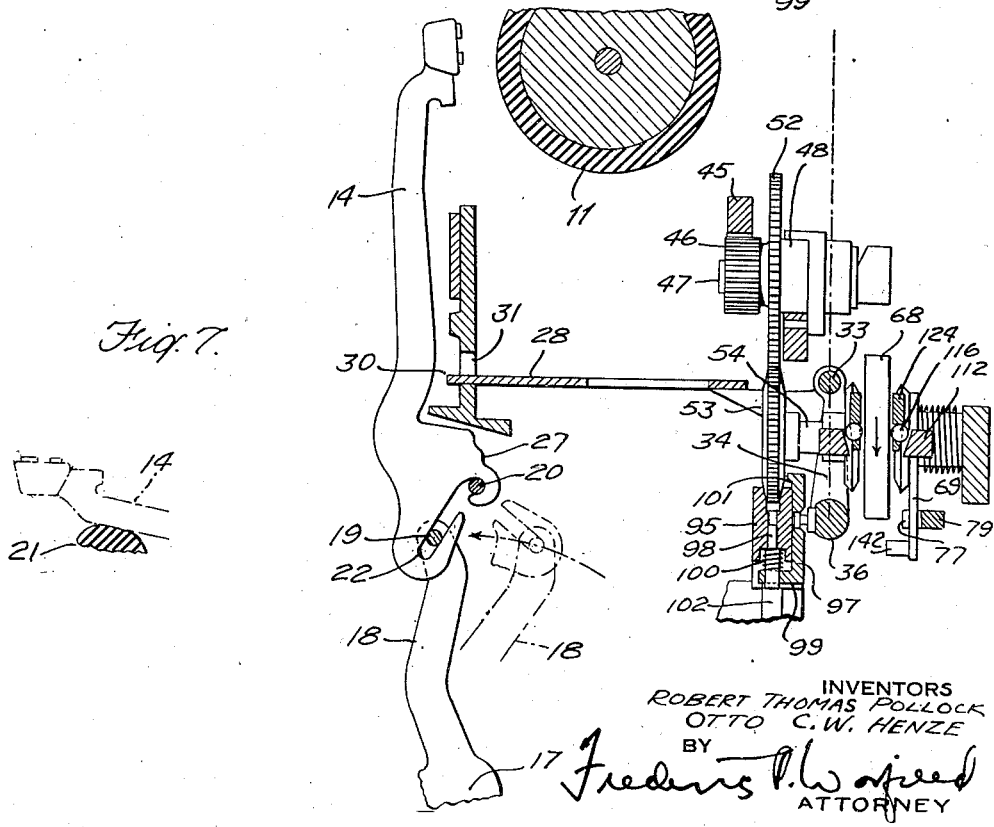

The timing of the operation of the various moving parts associated with the escapement mechanism is best explained in connection with Figs. 6 and 7. In Fig. 6 a type bar 14 is shown in dotted lines in its normal position resting against the cushion member 21. When the key associated with this type bar is depressed, the type bar swings upwardly about its pivot 20 until it reaches the position shown in dot-and-dash lines when the surfaces of the types have reached a point indicated at 138. This represents about ⅔ of the travel of the type bar and key. At this instant the cam surface 27 just touches the bail 26.

During this time the V block 95 is in its normal position away from the gear 53, so that the gear is free to turn. As the type bar 14 moves into the position shown in the solid lines of Fig. 6 and indicated at 139, which is a distance corresponding to half of the remaining distance of the type in its travel towards the platen, the bail 26 moves the plate 28 rearwardly and rocks the yoke 36 to cause the ball and socket joint 106—107 to raise the block holder 97 and push the block 95 against the gear wheel 53 to prevent its movement.

The ball clutch 116 is normally in gripping contact with the disk 68. Upon still further depression of the key, the type bar 14 moves to the position shown in Fig. 7 where the types are about ¼ inch from the platen. At this position, the lug 126 on the yoke 36 strikes the ball 129 and raises the block 119 and side plates 118 and balls 116, so that the disk 68 is released.

The type bar then moves against the platen and prints the character on the paper and thereupon returns again to its normal position, under the influence of the spring 23 (Fig. 1), when the pressure of the operator's finger is removed from the key. As it reaches the position of Fig. 7 on its return stroke, where the types are about ¼ inch away from the platen, the lug 126 is withdrawn far enough to the front of the machine to permit the block 119 and plates 118 to move downwardly, urged by the spring 133 to cause the balls 116 to wedge against the disk 68 again. However, the block 95 is still in engagement with the gear wheel 53, the spring 108 beneath the block having been compressed, and the block remains against the gear until the type bar again reaches the solid line position 139. Whereupon the block 95 is moved under the action of the ball and socket connection 106—107 away from the gear wheel 53, thus releasing it.

Figure 8:
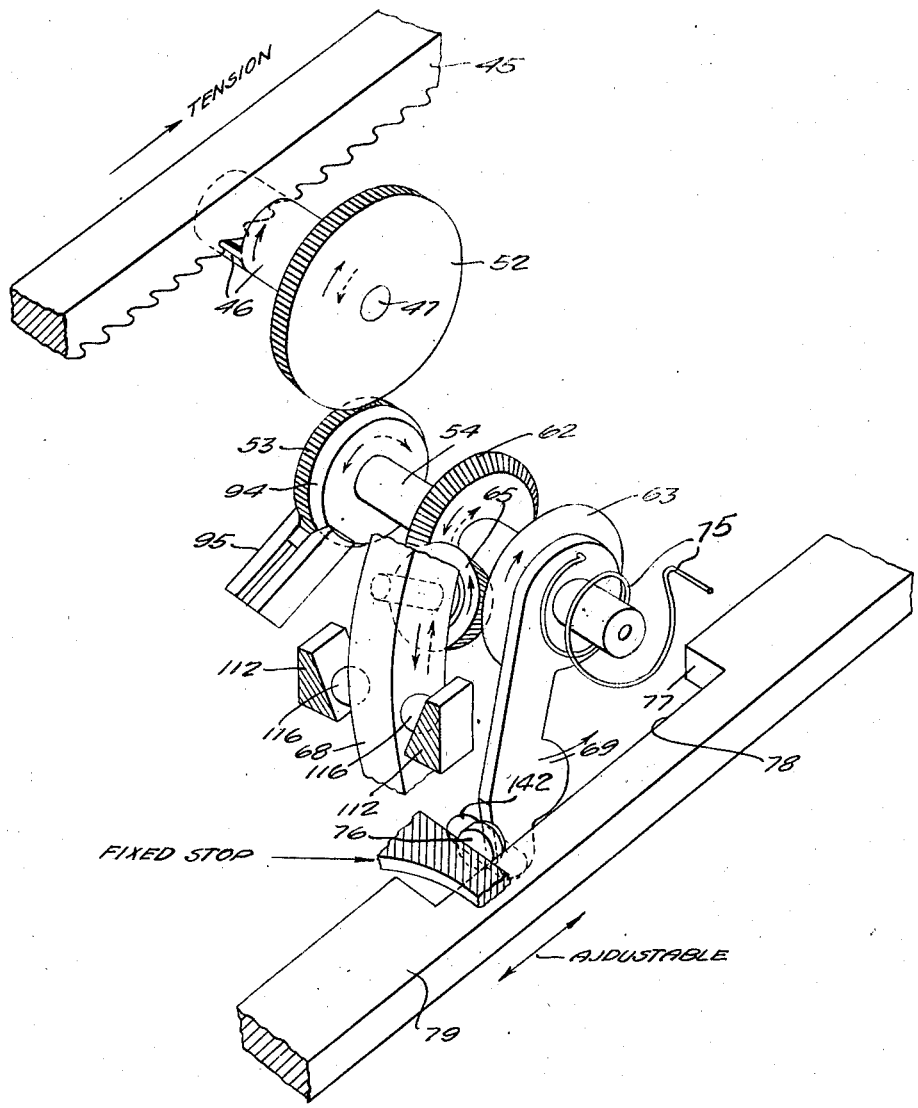
Fig. 8 is a diagrammatical perspective view of the escapement mechanism.

The complete operation of the escapement mechanism can best be understood from an inspection of Fig. 8. Normally the holding means 95 is released from engagement with the gear wheel 53 but the balls 116 are in gripping engagement with the disk 68. The carriage, under the tension of its spring, tends to move towards the right in Fig. 8 and in so doing tends to rotate the various gears in the direction of the solid arrows. Since the disk 68 is held by the balls 116 this causes the lever arm 69 to move towards the left against the fixed stop 76, this action winding the spring 75 which is connected between the lever arm and the frame of the machine. Thus the carriage is held from movement by the gripping action of the balls 116 and the lever arm 69 which is against the fixed stop 76 and cannot move any farther.

When a key is depressed, the first thing that happens is that the block 95 moves up into contact with the gear wheel 53, so that the release of any other part of the mechanism will not cause the carriage to move. Then the ball clutch 116 is released by the action of the lug 126 in raising the block 119 and side plates 118. This permits the disk 68 to turn, and the only thing which tends to turn it is the tension of the spring 75 which has been wound by the lever arm 69. The action of this spring causes the lever arm 69 to move towards the right, at the same time causing the planetary gears 64 and 65 to roll around the bevel gear 62 and thus causing the disk 68 to rotate. The lever arm 69 continues to swing to the right until the rounded surface 91 thereof strikes the adjustable stop 77. At this point the carriage is still held against movement by the wedge block 95 and the disk 68 cannot move farther because the lever arm 69 is at its limit of movement.

By this time the type has been printed upon the paper, and as the finger is removed from the key, the first thing that happens is that the ball clutch 116 is caused again to grip the disk 68 as the lug 126 moves away from the ball 129. Upon further movement of the key lever and type bar back towards their normal positions, the wedge block 95 is withdrawn from the gear wheel 53. At this point there is nothing to hold the carriage against movement except the spring on the lever arm 69 which is not strong enough and is overpowered by the spring controlling the carriage. The carriage then starts to move under the action of this spring, thus rotating the gear wheel 52 and gear wheel 53 in the direction of the solid arrows. Since the disk 68 is now rigidly held by the ball clutch 116, the bevel gear 62 which is connected to the gear 53 can only move if the bevel gear 63 is permitted to move in the opposite direction. This it can do because the lever arm 69 can swing through the space between the stop 77 and the fixed stop 76. When the lever arm strikes the fixed stop 76, none of the parts can move any farther and the carriage stops and is ready for the next type bar to print its character.

It will be noted that the distance the lever arm 69 moves from the fixed stop 76 when the ball clutch 116 is released determines the distance the carriage will move when the ball clutch has again been operated to grip the disk 68 and the wedge block 95 is withdrawn from the gear 53. This distance can thus be changed by adjusting the position of the adjustable stop 77, and the adjustment of this stop is entirely independent of the operation of the rest of the mechanism and can be done at any time, even while the mechanism is in operation. Moving the stop 77 towards the left in Fig. 8, which is done by screwing in the screw 85, will shorten the distance the lever arm 69 moves, and this decreases the distance the carriage moves when the key is released. Moving the stop 77 farther to the right, which is done by unscrewing the screw 85 and permitting the spring 89 to move the bar 79 farther to the right, will permit the lever arm 69 to move through a greater distance and will thus increase the distance which the carriage will move when the key is released.

Attention is drawn to the fact that the ball clutch 116 releases and grips the disk 68 almost instantaneously. The entire travel of the key bail 26 and associated plate 28 is only $\frac{1}{10}$ of an inch, and the balls 116 are not raised from their engagement with the disk 68 until the bail and associated plate 28 have moved through half their travel or approximately $\frac{5}{100}$ of an inch. But because of the angle of the surfaces 114 which control the action of the balls 116 and the fact that these parts are made of hardened steel permit the balls to release their grip on the disk 68 when they are moved through a distance so slight so as to be practically immeasurable.

In both clutches of the escapement mechanism of the invention, the wedge block 95 operating on the gear 53 and the balls 116 operating on the disk 68, the clutches do not need to engage these parts while they are moving and bring them to a stop. The clutches are only brought into engagement with their associated parts when these parts are stationary and thus act as holding means for the parts and not as braking means to stop them. This is important in this escapement mechanism because neither of the clutches are then subject to wear in operation and can be made with less gripping force than if moving parts had to be stopped by them. The shock of stopping the carriage is absorbed by the fixed stop 76 against which the lever arm 69 strikes when the carriage has completed its predetermined movement, and this fixed stop is made of hardened metal for this purpose.

The escapement mechanism is especially advantageous in a typewriting machine, as disclosed in the drawings, because it permits the adjustment of the space between letters on the typed paper. In Fig. 9 is shown four lines of typing, each line being made at a different setting of the adjustment bar 79, the first line being made with the bar set at 7, the second line with it set at 9, the third line with it set at 11, and the fourth line with it set at 13. Of course the bar may be set anywhere between these marks on the scale. Upon an inspection of Fig. 9, it will be seen that a word can be crowded into a relatively small space or spread out to cover a large space. This permits justification of lines and makes it possible to typewrite a page with the right hand margin as well as the left hand margin perfectly even. It also permits replacing a word of a given number of letters with a word of less letters or more letters. Words can also be emphasized by wider spacing of letters if desired.

By means of the escapement mechanism shown and described, a standard typewriter can be equipped with this adjustable spacing arrangement with only minor changes in the typewriter construction. In the present disclosure, which is that of an Underwood typewriter, the gear wheel 52 is used so that the escapement mechanism can be spaced under the pinion shaft 47, although in other typewriters it may be possible to eliminate this gear and place this differential mechanism on the same shaft as the pinion 46.

As has already been stated, the differential mechanism comprises three parts which are geared together, the bevel gear 62 which is rigidly connected with the gear 53 and thus with the pinion 46, the disk 68 which carries the planetary gears 64 and 65, and the bevel gear 63 which carries the lever arm 69.

Where fast operation is required, as in the case of a typewriter, these clutches, and especially that operating on the disk 68, should preferably be substantially instantaneous in their action for both releasing and gripping the element, because of the necessity for having this action take place during a very small movement of the type bar and associated key. When the escapement mechanism is used in other devices such a quick operating clutch may not be necessary.

The usual back-spacing lever of the typewriting machine may be operatively connected with a lever 140 (Fig. 5) which is provided with a hook 141 which hooks over a pin 142 on the lower end of the lever arm 69. When the back spacer key is depressed the lever 140 is caused to move to the right, as viewed in Fig. 5, which pulls the lever 69 to the right and therefore moves the carriage back against its spring. The distance it moves back will be the same through which it last moved forward. The back spacer key should then be held in this position while the type key is depressed.

The carriage of the typewriter may be manually moved in the opposite direction from its normal movement by virtue of the fact that the balls 116 will release automatically when the disk 68 is moved in a clockwise direction, as viewed from the rear of the machine in Fig. 5.

The ball clutch shown in this application and represented by balls 116, arms 112, and controlling arms 118, is per se not the subject matter of the present application but is disclosed and claimed in our application, Serial No. 429,887, filed February 7, 1942.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. An escapement mechanism comprising three elements operatively connected together in such a manner that if one of said elements is held against movement, movement of another of said elements will cause movement of a third, a first releasable holding means normally positioned to hold one of said elements, means to urge said last mentioned element in a predetermined direction, a second releasable holding means normally inoperative to hold a second one of said elements, means to limit the amount of movement of the third of said elements, means to urge said third element in a direction opposite to that in which it will tend to be moved by said first mentioned element-urging means in the normal operation of said mechanism, said third element-urging means being weaker than said first element-urging means, and means to operate said two holding means in succession with the holding period of said second holding means overlapping the holding period of said first holding means.

2. An escapement mechanism comprising three elements operatively connected together in such a manner that if one of said elements is held against movement, movement of another of said elements will cause movement of a third, a first releasable holding means normally positioned to hold one of said elements, means to urge said last mentioned element in a predetermined direction, a second releasable holding means normally inoperative to hold a second one of said elements, means to limit the amount of movement of the third of said elements, means to urge said third element in a direction opposite to that in which it will tend to be moved by said first mentioned element-urging means in the normal operation of said mechanism, said third element-urging means being weaker than said first element-urging means, and means to operate said two holding means in succession with the holding period of said second holding means overlapping the holding period of said first holding means, at least one of said holding means comprising a ball mounted at the side of said element and means to wedge said ball against said element.

3. An escapement mechanism comprising a movable element, a differential unit having a planetary pinion gear and a pair of bevel gears meshing with it, means operatively connecting one of said bevel gears to said element whereby when said bevel gear rotates said element is moved, means to urge said element to move in one direction, means to hold said element against movement in said direction, said means being normally inoperative, means to limit the angle of rotation of said second bevel gear, means to urge said second bevel gear to rotate in a direction opposite to that in which said element-urging means tends to move it, said means being weaker than said element-urging means, means to prevent said planetary pinion gear from revolving about the axis of said bevel gears while permitting rotation thereof, and means to produce a cycle of movement whereby said holding means is caused to operate to hold said element, then said planetary gear-revolution-prevention means is rendered inoperative, then said second bevel gear is rotated by its urging means to the limit of its rotation, then said planetary gear-revolution-prevention means is again rendered operative, then said holding means is rendered inoperative again, permitting said element to move until said second bevel gear reaches its other limit of rotation.

4. An escapement mechanism comprising a movable element, a differential unit having a planetary pinion gear and a pair of bevel gears meshing with it, means operatively connecting one of said bevel gears to said element whereby when said bevel gear rotates said element is moved, means to urge said element to move in one direction, means to hold said element against movement in said direction, said means being normally inoperative, means to limit the angle of rotation of said second bevel gear, means to urge said second bevel gear to rotate in a direction opposite to that in which said element-urging means tends to move it, said means being weaker than said element-urging means, means to prevent said planetary pinion gear from revolving about the axis of said bevel gears while permitting rotation thereof, means to produce a cycle of movement whereby said holding means is caused to operate to hold said element, then said planetary gear-revolution-prevention means is rendered inoperative, then said second bevel gear is rotated by its urging means to the limit of its rotation, then said planetary gear-revolution-prevention means is again rendered operative, then said holding means is rendered inoperative again, permitting said element to move until said second bevel gear reaches its other limit of rotation, and means to adjust the angle of rotation of said second bevel gear.

5. An escapement mechanism comprising a movable element, a differential unit having a rotatable disk carrying a planetary pinion gear and a pair of bevel gears coaxial with said disk and meshing with said pinion gear, means operatively connecting one of said bevel gears with said element whereby when said element is moved said bevel gear is rotated, means to urge said element to move in one direction, means to hold said element against movement in said direction, said means being normally inoperative, means to limit the angle of rotation of said second bevel gear, means to urge said second bevel gear to rotate in a direction opposite to that in which said element-urging means tends to move it, said means being weaker than said element-urging means, means to hold said disk against rotation while permitting rotation of said pinion gear, and means to produce a cycle of movement whereby said element holding means is first rendered operative to hold said element, then said disk-holding means is rendered inoperative whereupon said second bevel gear is rotated to the limit of its rotation by its urging means, then said disk-holding means is again rendered operative to hold said disk, then said element-holding means is rendered inoperative, permitting said element to move until said second bevel gear reaches its other limit of movement, the means to hold said disk comprising a ball on one side of said disk and means to cause said ball to grip the side of said disk.

6. An escapement mechanism comprising a movable element, a differential unit having a rotatable disk carrying a planetary pinion gear and a pair of bevel gears coaxial with said disk and meshing with said pinion gear, means operatively connecting one of said bevel gears with said element whereby when said element is moved said bevel gear is rotated, means to urge said element to move in one direction, means to hold said element against movement in said direction, said means being normally inoperative, means to limit the angle of rotation of said second bevel gear, means to urge said second bevel gear to rotate in a direction opposite to that in which said element-urging means tends to move it, said means being weaker than said element-urging means, means to hold said disk against rotation while permitting rotation of said pinion gear, means to produce a cycle of movement whereby said element holding means is first rendered operative to hold said element, then said disk-holding means is rendered inoperative whereupon said second bevel gear is rotated to the limit of its rotation by its urging means, then said disk-holding means is again rendered operative to hold said disk, then said element-holding means is rendered inoperative, permitting said element to move until said second bevel gear reaches its other limit of movement, the means to hold said disk comprising a ball on one side of said disk and means to cause said ball to grip the side of said disk, and means to adjust the angle of rotation of said second bevel gear.

7. A typewriting machine comprising a plurality of keys, a carriage mounted for longitudinal movement, an escapement mechanism associated with said keys and said carriage, said mechanism comprising three elements operatively connected together in such a manner that when any one is held against movement, movement of one of the others will cause movement of the third, means operatively to connect one of said elements to said carriage whereby when said carriage is moved said element is moved, means to urge said carriage in one direction, releasable means to hold said carriage against movement, releasable means to hold another of said elements against movement, means to limit the amount of movement of said third element, means to urge said third element in a direction opposite to that in which said carriage-urging means would tend to move it under normal operation of said machine, said third element-urging means being weaker than said carriage-urging means, and means to cause said two holding means to operate in succession when one of said keys is depressed, the period of operation of said second holding means overlapping the period of operation of said first holding means said first holding means preventing movement of the carriage during the printing operation and said second holding means coming into operation after the printing is completed.

8. A typewriting machine comprising a plurality of keys, a carriage mounted for longitudinal movement, an escapement mechanism associated with said keys and said carriage, said mechanism comprising three elements operatively connected together in such a manner that when any one is held against movement, movement of one of the others will cause movement of the third, means operatively to connect one of said elements to said carriage whereby when said carriage is moved said element is moved, means to urge said carriage in one direction, releasable means to hold said carriage against movement, releasable means to hold another of said elements against movement, means to limit the amount of movement of said third element, means to urge said third element in a direction opposite to that in which said carriage-urging means would tend to move it under normal operation of said machine, said third element-urging mans being weaker than said carriage-urging means, means to cause said two holding means to operate in succession when one of said keys is depressed, the period of operation of said second holding means overlapping the period of operation of said first holding means, means to adjust the amount of movement of said third element said first holding means preventing movement of the carriage during the printing operation and said second holding means coming into operation after the printing is completed.

9. In a typewriter, a plurality of keys, a carriage, means to hold said carriage against movement thereof, said means being normally inoperative, means normally to urge said carriage to move in a predetermined direction, a differential mechanism associated with said carriage having a planetary pinion gear and two bevel gears meshing therewith, means to connect one of said bevel gears to said carriage, whereby when said carriage is moved said bevel gear is rotated, means to limit the angle of rotation of said second bevel gear, means to urge said second bevel gear to rotate in a direction opposite to that in which said carriage-urging means tends to move it, said means being weaker than said carriage-urging means, means normally holding said planetary pinion gear against revolution about the axis of said bevel gears, and means whereby when one of said keys is depressed said carriage-holding means is first rendered operative to hold said carriage, then said planetary-gear-holding means is rendered inoperative, thus releasing said planetary gear, whereupon said second bevel gear will be rotated by its urging means to its limit of rotation, then said planetary-gear-holding means is rendered operative to hold said planetary gear against revolution thereof, then said carriage-holding means is rendered inoperative, thus permitting said carriage to move under the action of said carriage-urging means until said second bevel gear has reached the other limit of its rotation.

10. In a typewriter, a plurality of keys, a carriage, means to hold said carriage against movement thereof, said means being normally inoperative, means normally to urge said carriage to move in a predetermined direction, a differential mechanism associated with said carriage having a planetary pinion gear and two bevel gears meshing therewith, means to connect one of said bevel gears to said carriage, whereby when said carriage is moved said bevel gear is rotated, means to limit the angle of rotation of said second bevel gear, means to urge said second bevel gear to rotate in a direction opposite to that in which said carriage-urging means tends to move it, said means being weaker than said carriage-urging means, means normally holding said planetary pinion gear against revolution about the axis of said bevel gears, means whereby when one of said keys is depressed said carriage-holding means is first rendered operative to hold said carriage, then said planetary-gear-holding means is rendered inoperative, thus releasing said planetary gear, whereupon said second bevel gear will be rotated by its urging means to its limit of rotation, then said planetary-gear-holding means is rendered operative to hold said planetary gear revolution thereof, then said carriage-holding means is rendered inoperative, thus permitting said carriage to move under the action of said carriage-urging means until said second bevel gear has reached the other limit of its rotation, and means to adjust the angel of rotation of said second bevel gear.

11. In a typewriter, a plurality of keys, a carriage, means to hold said carriage against movement thereof, said means being normally inoperative, means normally to urge said carriage to move in a predetermined direction, a differential unit associated with said carriage having a disk carrying a planetary pinion gear and two bevel gears coaxial with said disk and meshing with said pinion gear, means operatively to connect one of said bevel gears to said carriage whereby when said carriage is moved said bevel gear is rotated, means to limit the angle of rotation of said second bevel gear, means to urge said second bevel gear to rotate in a direction opposite to that in which said element-urging means tends to move it, said means being weaker than said element-urging means, means normally holding said disk against rotation while permitting rotation of said pinion gear, and means whereby when one of said keys is depressed, said carriage-holding means is first rendered operative to hold said carriage, then said disk-holding means is rendered inoperative whereupon said second bevel gear will be rotated by its urging means to its limit of rotation, then said disk-holding means is rendered operative to hold said disk, then said element-holding means is rendered inoperative again, thus permitting said carriage to move under the action of its urging means until said second bevel gear has reached the other limit of its rotation, the means to hold said disk comprising a pair of balls on opposite sides of said disk and means to cause said balls to grip the sides of said disk.

12. In a typewriter, a plurality of keys, a carriage, means to hold said carriage against movement thereof, said means being normally inoperative, means normally to urge said carriage to move in a predetermined direction, a differential unit associated with said carriage having a disk carrying a planetary pinion gear and two bevel gears coaxial with said disk and meshing with said pinion gear, means operatively to connect one of said bevel gears to said carriage whereby when said carriage is moved said bevel gear is rotated, means to limit the angle of rotation of said second bevel gear, means to urge said second bevel gear to rotate in a direction opposite to that in which said element-urging means tends to move it, said means being weaker than said element-urging means, means normally holding said disk against rotation while permitting rotation of said pinion gear, means whereby when one of said keys is depressed, said carriage-holding means is first rendered operative to hold said carriage, then said disk-holding means is rendered inoperative whereupon said second bevel gear will be rotated by its urging means to its limit of rotation, then said disk-holding means is rendered operative to hold said disk, then said element-holding means is rendered inoperative again, thus permitting said carriage to move under the action of its urging means until second bevel gear has reached the other limit of its rotation, the means to hold said disk comprising a pair of balls on opposite sides of said disk and means to cause said balls to grip the sides of said disk, and means to adjust the angle of rotation of said second bevel gear.

13. In a typewriter, a plurality of keys, a carriage mounted for longitudinal movement, means normally to urge said carriage in one direction, a rack connected to said carriage and arranged parallel thereto, a pinion in meshing engagement with said rack, a shaft for rotatably supporting said pinion and secured thereto, a bevel gear connected to said shaft, a disk freely rotatable on said shaft, a pinion gear mounted on said disk and having meshing engagement with said bevel gear, a second bevel gear freely rotatable on said shaft and having meshing engagement with the opposite side of said pinion gear, means to limit the angle of rotation of said second bevel gear, means to urge said second bevel gear to rotate in the opposite direction to that in which said carriage-urging means would tend to move it, said means being weaker than said carriage-urging means, means to hold said carriage against the action of its urging means, said means being normally inoperative, means to hold said disk against rotation, and means whereby when one of said keys is depressed, said carriage-holding means is first rendered operative, then said disk-holding means is released, whereby said second bevel gear will be rotated by its urging means to its other limit of rotation, then said disk-holding means is rendered operative to hold said disk, then said carriage-holding means is rendered inoperative again, thus permitting said carriage to move under the action of its urging means until said second bevel gear has reached the other limit of its movement.

14. In a typewriter, a plurality of keys, a carriage mounted for longitudinal movement, means normally to urge said carriage in one direction, a rack connected to said carriage and arranged parallel thereto, a pinion in meshing engagement with said rack, a shaft for rotatably supporting said pinion and secured thereto, a bevel gear connected to said shaft, a disk freely rotatable on said shaft, a pinion gear mounted on said disk and having meshing engagement with said bevel gear, a second bevel gear freely rotatable on said shaft and having meshing engagement with the opposite side of said pinion gear, means to limit the angle of rotation of said second bevel gear, means to urge said second bevel gear to rotate in the opposite direction to that in which said carriage-urging means would tend to move it, said means being weaker than said carriage-urging means, means to hold said carriage against the action of its urging means, said means being normally inoperative, means to hold said disk against rotation, means whereby when one of said keys is depressed, said carriage-holding means is first rendered operative, then said disk-holding means is released, whereby said second bevel gear will be rotated by its urging means to its other limit of rotation, then said disk-holding means is rendered operative to hold said disk, then said carriage-holding means is rendered inoperative again, thus permitting said carriage to move under the action of its urging means until said second bevel gear has reached the other limit of its movement, and means to adjust the angle of rotation of said second bevel gear.

15. In a typewriter, a plurality of keys, a carriage mounted for longitudinal movement, means normally to urge said carriage in one direction, a rack connected to said carriage and arranged parallel thereto, a pinion in meshing engagement with said rack, a shaft for rotatably supporting said pinion and secured thereto, a bevel gear connected to said shaft, a disk freely rotatable on said shaft, a pinion gear mounted on said disk and having meshing engagement with said bevel gear, a second bevel gear freely rotatable on said shaft and having meshing engagement with the opposite side of said pinion gear, means to limit the angle of rotation of said second bevel gear, means to urge said second bevel gear to rotate in the opposite direction to that in which said carriage-urging means would tend to move it, said means being weaker than said carriage-urging means, means to hold said carriage against the action of its urging means, said means being normally inoperative, means to hold said disk against rotation, and means whereby when one of said keys is depressed, said carriage-holding means is first rendered operative, then said disk-holding means is released, whereby said second bevel gear will be rotated by its urging means to its other limit of rotation, then said disk-holding means is rendered operative to hold said disk, then said carriage-holding means is rendered inoperative again, thus permitting said carriage to move under the action of its urging means until said second bevel gear has reached the other limit of its movement, said disk-holding means comprising a ball on one side of said disk and means to cause said ball to grip said disk.

16. In an escapement mechanism, a shaft connected to rotate with the movement of the member controlled by such mechanism, a first control means operable to prevent rotation of said shaft at certain times, and comprising a member movable into and out of operative position with reference thereto, a differential gear mechanism including a first gear fixed to the shaft and a second gear loosely mounted upon said shaft for limited oscillation thereon within predetermined limits, adjustable means for limiting oscillation of the second gear, said differential gear mechanism also including a third gear meshing with said first and second gears, a second control means carrying said third gear, means for normally holding said second control means against movement, and means, operable while said first control means is in position to prevent rotation of said shaft, for releasing said holding means to allow the second control means to rotate to an adjustably predetermined extent.

17. In an escapement mechanism, a shaft connected to rotate with the movement of the member controlled by such mechanism, a first control means operable to prevent rotation of said shaft at certain times, and comprising a member movable into and out of operative position with reference thereto, a differential gear mechanism including a first gear fixed to the shaft and a second gear loosely mounted upon said shaft for limited oscillation thereon within predetermined limits, adjustable means for limiting oscillation of the second gear, said differential gear mechanism also including a third gear meshing with said first and second gears, a control disk carrying said third gear, means for normally holding said disk against movement, and means operable while said first control means is acting to prevent rotation of said shaft for releasing said disk holding means to allow the disk to rotate to an adjustably predetermined extent.

18. In an escapement mechanism, a shaft connected to rotate with the movement of the member controlled by such mechanism, a first control means operable to prevent rotation of said shaft at certain times, and comprising a member movable into and out of operative position with reference thereto, a differential gear mechanism including a first gear fixed to the shaft and a second gear loosely mounted upon said shaft for limited oscillation thereon within predetermined limits, adjustable means for limiting oscillation of the second gear, said differential gear mechanism also including a third gear meshing with said first and second gears, a control disk carrying said third gear, means for normally holding said disk against movement, and means operable while said first control means is acting to prevent rotation of said shaft for releasing said disk holding means to allow the disk to rotate to an adjustably predetermined extent, said releasing and holding means being substantially instantaneous in operation.

19. In an escapement mechanism, a shaft connected to rotate with the movement of the member controlled by such mechanism, a first control means operable to prevent rotation of said shaft at certain times, and comprising a member movable into and out of operative position with reference thereto, a differential gear mechanism including a first gear fixed to the shaft and a second gear loosely mounted upon said shaft for limited oscillation thereon within predetermined limits, adjustable means for limiting oscillation of the second gear, said differential gear mechanism also including a third gear meshing with said first and second gears, a control disk carrying said third gear, means for normally holding said disk against movement, and means operable while said first control means is acting to prevent rotation of said shaft for releasing said disk holding means to allow the disk to rotate to an adjustably predetermined extent, said releasing and holding means comprising a friction device operating upon a side face of said control disk.

20. In an escapement mechanism, a shaft connected to rotate with the movement of the member controlled by such mechanism, a first control means operable to prevent rotation of said shaft at certain times, and comprising a member movable into and out of operative position with reference thereto, a differential gear mechanism including a first gear fixed to the shaft and a second gear loosely mounted upon said shaft for limited oscillation thereon within predetermined limits, adjustable means for limiting oscillation of the second gear, said differential gear mechanism also including a third gear meshing with said first and second gears, a control disk carrying said third gear, means for normally holding said disk against movement, and means operable while said first control means is acting to prevent rotation of said shaft for releasing said disk holding means to allow the disk to rotate to an adjustably predetermined extent, said releasing and holding means comprising a ball friction clutch operating upon a plane side face of said control disk.

ROBERT THOMAS POLLOCK.
OTTO C. W. HENZE.